R. HASBROOK.
SANITARY TEETH CLEANER.
APPLICATION FILED JUNE 2, 1919.

1,346,125.

Patented July 13, 1920.

Inventor
Roy Hasbrook
By Walton Harrison
his Attorney

UNITED STATES PATENT OFFICE.

ROY HASBROOK, OF NEW YORK, N. Y.

SANITARY TEETH-CLEANER.

1,346,125.   Specification of Letters Patent.   Patented July 13, 1920.

Application filed June 2, 1919. Serial No. 301,253.

*To all whom it may concern:*

Be it known that I, ROY HASBROOK, a citizen of the United States, residing in the city of New York, in the county of New York and State of New York, have invented certain new and useful Improvements in Sanitary Teeth-Cleaners, of which the following is a full, clear, and exact description.

My invention relates to sanitary teeth cleaners, my more particular purpose being to provide a device of this type which can be made up cheaply from cut or stamped pieces of stock material and which may be readily sold as a so-called ten cent article or may be embodied in a tooth brush set.

My invention further contemplates a device of this character so constructed that it may be readily taken apart or divided into sections which can easily be grouped or nested together, and in which the different parts are readily replaceable.

My invention further contemplates a device of this kind in which one part is movable relatively to another for the purpose of facilitating the application of the device to the teeth.

Reference is made to the accompanying drawing, forming a part of this specification, and in which like letters indicate like parts throughout the several figures.

Figure 1:
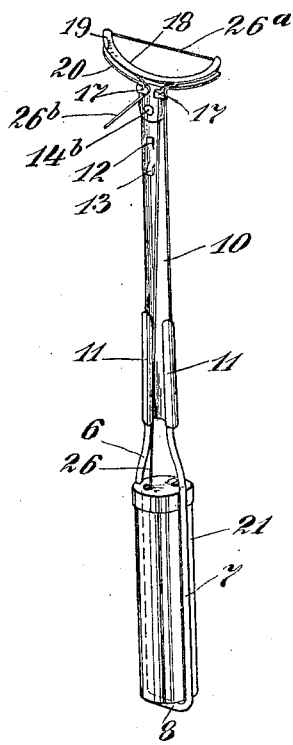
Figure 1 is a perspective showing one form of my device complete and ready for use.

A wire frame 6 is provided with two straight portions 7 disposed parallel with each other and with a middle portion 8 connecting the two portions 7. The frame 6 is further provided with two end portions 9 and has a general U-form.

A shank 10 is made of sheet metal and is provided with a pair of reverting edge portions 11. The shank is slightly curved in cross section, as indicated more particularly in Fig. 5 and is provided with a pair of tongues 12—13, integral with it and struck, cut or stamped so as to be partially severed from the main body of the shank.

Figure 2:
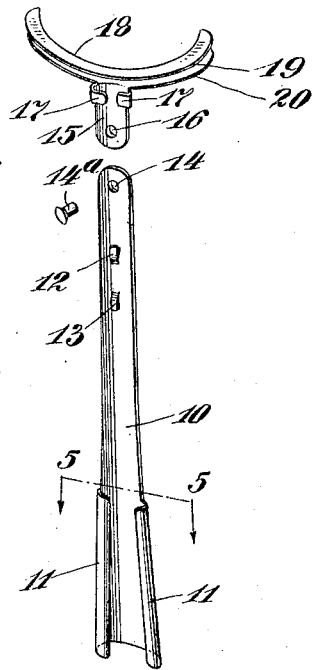
Fig. 2 is a perspective showing the several parts of the device as detached from each other, but assembled in positions suggestive of the manner in which they are to be connected.

A hole 14 is provided and is disposed close to one end of the shank, as shown more particularly in Fig. 2. A pivot pin $14^a$ is adapted to extend through the hole 14. A leaf 15 made of sheet metal has a form indicated more particularly in Fig. 2. This leaf is provided with a hole 16 into which the pivot pin $14^a$ may be extended after being thrust through the hole 14. With the pivot pin $14^a$ extending through the hole 14 and into the hole 16, it is riveted, brazed, soldered, or otherwise firmly secured to the leaf 15.

Extending from the edges of the leaf 15, and bent toward each other, are a pair of tongues 17, serving as guides, as hereinafter described. The leaf 15 carries a member 18, integral with it, and having a general arcuate form. The member 18 is provided with edge portions 19, 20, integral with it, and disposed parallel to each other, as shown more particularly in Fig. 2. The space between the edges 19 and 20 constitutes a groove having a general arcuate form. After the pivot $14^a$ is secured in position, as above described, it appears as indicated at $14^b$ near the top of Fig. 1.

Figure 3:
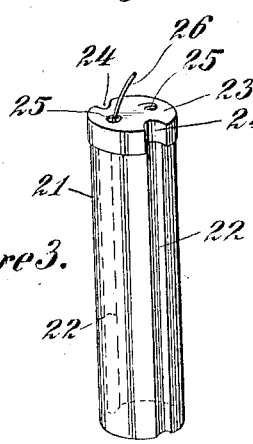
Fig. 3 is a perspective showing one type of container forming a part of my device.

A container 21 is made of metal and has the general form of an elongated box, as shown more particularly in Figs. 1 and 3. The container is provided with a pair of grooves 22, disposed upon its opposite sides and extended parallel with its general longitudinal axis. The container is further provided with a cap 23 with holes 25 through it, this cap being provided with a pair of oppositely disposed grooves 24. Thus the container with its cap is as a unit, provided with a pair of oppositely disposed grooves extending throughout its entire length. The container 21 carries a supply of dental floss in the form of a thread 26.

This thread extends outwardly through one of the holes 25 and into engagement with one of the tongues 17, which thus serves as a guide for the thread. Thence the thread extends between the flanges 19—20 and is provided with a portion 26$^a$ extending like a bow string across the arcuate member 18. The thread is also provided with a portion 26$^b$ which extends back between the arcuate flanges 19—20 and into engagement with the tongue 17.

The operator, by grasping the free end of the portion 26$^b$ and pulling upon the same, can draw out a few inches of the dental floss from the container. In doing this, he necessarily brings out a superfluous length of the floss and it is necessary to cut this off. For this purpose, the operator simply brings the dental floss around under one of the tongues 12 or 13 and by giving it a little jerk, causes the tongue to cut the thread of floss. This operation may be repeated as often as desired and every time it is repeated, it brings a new portion 26$^a$ of the dental floss into the space between the ends of the arcuate guide member 18.

Figure 6:
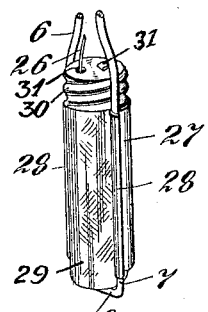
Fig. 6 is a fragmentary perspective showing another type of container used as a part of my device and employed in connection with the clip shown in Fig. 4.
Figure 4:
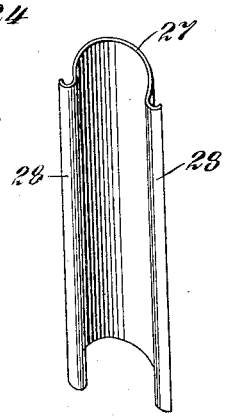
Fig. 4 is a perspective of a clip for holding a different type of container and forming a part of my device.

If desired, the clip 27, shown more particularly in Fig. 4, can be used in connection with the wire frame 6, and for this purpose the clip is provided with reverting edge portions 28. The clip is connected to the wire frame 6 by simply forcing a part of the body portion 27 between the parallel portions 7 of the wire frame, so that the edge portions 28 lodge against the portions 7 of the frame. A container 29, which may be made of glass, fits neatly into the clip 27 when the latter is mounted in position, as may be understood from Fig. 6. The container 28 carries a screw cap 30, which is provided with holes 31 through which the dental floss thread 26 may be drawn. The advantage of the container shown in Fig. 3 is that, being made entirely of metal, it can be constructed cheaply. An advantage of the container 29 shown in Fig. 6 is that it is of a type already in common use and may be purchased in practically any department store or ten cent store and used, if need be, without alteration.

The container shown in Fig. 3 is secured to the wire frame 6 by merely forcing the container in between the two parallel portions 7 of this frame, so that the said parallel portions occupy the grooves 22. In order to remove the container, a slight pressure is applied to it in a lateral direction, so as to force it out from the parallel portions 7 of the wire frame.

Figure 5:
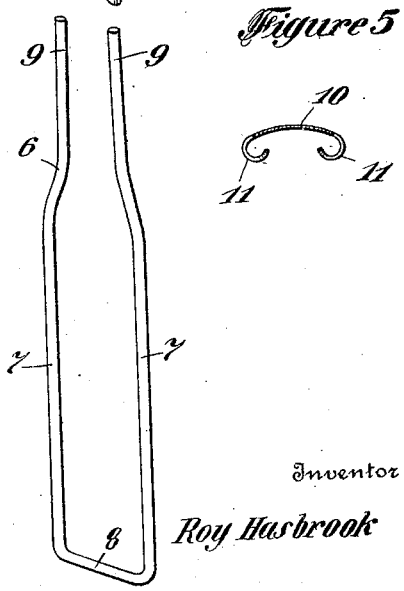
Fig. 5 is a section on the line 5—5 of Fig. 2, looking in the direction indicated by the arrows.

Owing to the fact that the shank 10 has a slight curvature, as indicated in Fig. 5, it has, relative to the leaf 15, a slight spring or washer-like action, so that there is always a gentle presure between the leaf 15 and the adjacent portion of the shank 10.

Owing to this fact, the leaf 15 may be adjusted or tilted to different angles relative to the shank 10.

With the parts in the positions indicated in Fig. 1 the operator, by pressing his thumb upon the thread 26 and against any adjacent convenient portion of the shank 10, and at the same time pulling hard upon the end portion 26 of the thread, can tighten the thread and wedge it tightly underneath each of the tongues 17, so that the exposed portion 26$^a$ remains under tension.

The thread may also be passed beneath and partially around one or both of the tongues 12, 13, and thus secured tightly in position. Each tongue 12, 13 can also be used as a cutter and as a fastener for the thread.

The reverting portions 11 also serve as guides for the thread.

Thus the arcuate guide member 18 is adjustable to different angles relative to the shank 10 and as a consequence the exposed portion 26$^a$ of dental floss is likewise adjustable to different positions relative to the length of the shank. This gives the operator an advantage in using the device as in practice he merely grasps the arcuate guide member 18 and tilts it as desired in order to bring the exposed portion 26$^a$ of the dental floss into any desired position convenient for cleaning the teeth.

When the device is in actual use for cleaning the teeth, the container, whether of the form shown at 21 or of the form appearing at 29, serves as a handle whereby the device may be readily manipulated.

The device as a whole may be treated much after the manner of an ordinary tooth brush, or may be taken apart as indicated in Fig. 2 and when it is taken apart, the various pieces may be easily nested together or assembled so as to occupy a comparatively small space. They may, if desired, be carried in a little box or packet of any convenient form.

I do not limit myself to the precise mechanism shown, as variations may be made therefrom without departing from the spirit of my invention.

I claim:

1. A device of the character described, comprising a wire frame provided with means for supporting a container and further provided with a pair of extending end portions; a shank provided with a pair of reverting edge portions for engaging said extending end portions, said shank being further provided with a tongue serving as a cutter; a leaf pivotally mounted upon said shank and provided with a portion formed into an arcuate guiding member for receiving a length of floss supplied from said container, and means for maintaining an exposed portion of said floss stretched across said arcuate guiding member, for use upon the teeth.

2. A device of the character described, comprising a shank made of sheet metal, slightly curved in cross section, a leaf of sheet metal fitted against said shank, a connecting member for holding said leaf against said shank so that the curvature of said shank serves to maintain a gentle pressure between said leaf and said shank in order to render said leaf adjustable into different positions relative to said shank, a member carried by said leaf and bent into a general arcuate form for the purpose of supporting a member of dental floss, and means carried by said leaf for guiding said portion of dental floss relative to said member.

3. A device of the character described comprising a handle made of a single piece of spring wire, made double so as to present a pair of wire members disposed parallel to each other, means for detachably supporting between said wire members a container for thread, and mechanism carried by said handle for maintaining said thread taut.

4. A device of the character described, comprising a shank member for supporting a portion of thread in order to enable the same to be used for cleaning the teeth, a wire handle engaging said shank member and having substantially a U-form, and a container provided with a pair of oppositely disposed grooves for detachably receiving a pair of oppositely disposed portions of said wire handle in order to detachably support said container upon said handle.

5. A device of the character described, comprising a shank member for supporting a portion of thread in order to enable the same to be used for cleaning the teeth, a wire handle engaging said shank member and having substantially a U-form, a separate clip made of sheet metal bent so as to engage a pair of oppositely disposed portions of said wire handle so as to enable said wire handle to detachably support said clip when sprung in between said oppositely disposed portions thereof, and a thread container of such form as to fit detachably into said wire clip, so as to be supported thereby.

6. A device of the character described, comprising a shank made of sheet metal and provided with a pair of arcuate guiding members extending from it in opposite directions for holding a thread, said guiding members being integral with said shank member and so disposed that a thread engaging said guiding members is held taut and free, said shank member being further provided with a pair of ears located at the base of said pair of guiding members, said ears being so formed as to extend backwardly upon said shank and to extend toward each other, for the purpose of guiding said thread.

ROY HASBROOK.